United States Patent

Berghoff et al.

Patent Number: 6,073,864
Date of Patent: Jun. 13, 2000

[54] METERING EXPANSION NOZZLE FOR $CO_2$

[75] Inventors: Rudolf Berghoff, Meschede; Reinhard Balduhn, Bad Driburg, both of Germany

[73] Assignee: AGA Aktiebolag, Lindingo, Sweden

[21] Appl. No.: 09/011,131

[22] PCT Filed: May 22, 1997

[86] PCT No.: PCT/EP97/02612

§ 371 Date: May 11, 1998

§ 102(e) Date: May 11, 1998

[87] PCT Pub. No.: WO97/46839

PCT Pub. Date: Dec. 11, 1997

[30] Foreign Application Priority Data

May 31, 1996 [DE] Germany ............ 196 21 835

[51] Int. Cl.[7] .................................. B05B 1/32
[52] U.S. Cl. .................. 239/573; 239/583; 239/596; 239/597; 62/521
[58] Field of Search .................. 239/573, 569, 239/583, 597, 596, 589; 62/521, 603

[56] References Cited

U.S. PATENT DOCUMENTS

| | | |
|---|---|---|
| 1,969,169 | 8/1934 | Eichmann . |
| 3,014,705 | 12/1961 | Colucci . |
| 3,109,296 | 11/1963 | Williamson et al. . |
| 3,672,181 | 6/1972 | Tyree, Jr. . |
| 3,815,377 | 6/1974 | Tyree, Jr. . |
| 3,905,555 | 9/1975 | Gateshill et al. . |
| 4,187,325 | 2/1980 | Tyree, Jr. . |
| 5,040,374 | 8/1991 | Micheau . |
| 5,611,491 | 3/1997 | Bowers ........................ 62/603 X |

FOREIGN PATENT DOCUMENTS

| | | |
|---|---|---|
| 0 057 119 | 8/1982 | European Pat. Off. . |
| 0 447 683 | 9/1991 | European Pat. Off. . |
| 2 253 193 | 6/1975 | France . |

*Primary Examiner*—Lesley D. Morris
*Attorney, Agent, or Firm*—Browdy and Neimark

[57] ABSTRACT

An expansion nozzle (20) for making carbon-dioxide snow from liquid carbon dioxide, for spraying refrigerated or frozen items (2), nozzle has an integrated metering valve (30) with a discharge aperture (32), an intake-side valve seat (33), and a valve needle (31) adjustable relative to the valve seat (33). The needle projects into the discharge aperture (32). A jet shaper (60) adjoins the discharge channel (35), in which the liquid carbon dioxide expands within a cross section widened at an end thereof. An expansion region (62) with a diverging cross section has a rectangular flow cross section.

33 Claims, 4 Drawing Sheets

METERING EXPANSION NOZZLE FOR CO$_2$

The invention relates to an expansion nozzle and a method for making carbon-dioxide snow for spraying refrigerated or frozen items.

It is known from U.S. Pat. No. 3,815,377 to cool or shock-freeze refrigerated or frozen items, for example food items, by spraying them with carbon-dioxide snow produced through the expansion of liquid carbon dioxide in an expansion nozzle. For this purpose, the refrigerated or frozen items are typically located in a refrigeration or froster chamber, into which a supply line for liquid carbon dioxide leads; the expansion nozzle is disposed at the end of this line in the refrigeration or froster chamber. A throttle valve that regulates the flow-through is usually provided in the supply line. The CO$_2$ is held, normally in liquid form, in a storage tank, where it is maintained in equilibrium with the CO$_2$ gas phase above the liquid in the tank. The pressure in the tank is usually maintained at about 18 bar, and the temperature is maintained at about $-23°$ C. In the systems known up to now, usually two pipelines lead from the tank to the refrigeration or froster chamber. In one line, the liquid CO$_2$ flows to the refrigeration or froster chamber, where it makes available the necessary cooling capacity. The second pipeline leads from the upper gas region of the tank to the refrigeration or froster chamber, and is connected to the first line by way of a stop valve shortly before it enters the refrigeration or froster chamber. The tank and the first line are insulated with a thick insulating layer, for example comprising PU foam, against the penetration of heat or loss of cold. Gaseous CO$_2$ flows to the refrigeration or froster chamber through the second pipeline, which is not insulated. This serves to rinse the part of the liquid pipeline disposed behind the metering valve, as well as the expansion elements. To attain and maintain the desired operating temperature in the refrigeration or froster chamber, CO$_2$ is usually sprayed into the refrigeration or froster chamber in cycles. To this end, a temperature measurement is performed in the refrigeration or froster chamber. If the temperature exceeds a set limit value, the supply of cooling medium is initiated, that is, the valves for liquid CO$_2$ in the supply line are opened. If the temperature is below a set limit value, the supply of cooling medium is cut off, that is, the valves are re-closed. The initiation and cutoff of cooling medium supply is typically effected with magnet valves disposed in the supply line, outside of the refrigeration or froster chamber. After the supply of cooling medium has been cut off, the pressure in the adjoining pipe and the expansion elements drops to an ambient pressure of about 1 bar. If the pressure drops below the triple-point pressure of 5.18 bar while liquid CO$_2$ is still in the supply line, a phase conversion into solid CO$_2$ snow occurs. This solid CO$_2$ snow can no longer exit the expansion elements, thereby clogging the system. In an unfavorable case, this can lead to a blockage of the valves and, in an extreme case, large portions of the entire pipeline. The pipelines must then be closed at the tank and thawed over a period of several hours. Furthermore, in an extreme case of blockage, the danger of a line rupture exists, because pressures of up to 60 bar can be present in the pipelines. To prevent such clogs, the liquid line behind the valve and the expansion element are re-rinsed by means of the gaseous CO$_2$ from the second line. The CO$_2$ gas flowing in forces the liquid out of the line system, and prevents a pressure drop below the triple point as long as CO$_2$ liquid is in the pipeline.

A disadvantage of this apparatus is that additional cooling medium is required for rinsing the liquid line and maintaining the pressure in the liquid line with the CO$_2$ gas. This CO$_2$ gas does not contribute to the cooling capacity of the froster. To the contrary, the CO$_2$ gas used in the re-rinsing process additionally warms the atmosphere in the refrigeration or froster chamber, so the pause cycles, during which no cooling medium is sprayed in, are shortened, and the cooling-medium consumption is undesirably high. A further disadvantage is that the temperature in the refrigeration or froster chamber is not constant over time, but fluctuates between an upper and a lower set limit value. As a result, a temperature fluctuation likewise occurs in the refrigeration or froster chamber, which affects product quality. Such temperature fluctuations can be reduced, however, by the setting of the upper and lower limit values in a small range; however, this again reduces the period of a cooling cycle and thus the switching frequency for the spraying cycles. Because re-rinsing with CO$_2$ gas must be performed after each spraying cycle, the losses due to the warm CO$_2$ gas increase. Up to this point, a reliable, continuous metering without clogging of the expansion elements was not possible in the apparatuses and expansion nozzles with the cooling medium CO$_2$ occurring in three phases.

It is the object of the invention to create an expansion nozzle and a method of the type mentioned at the outset, so that, with an inexpensive and simple design of the expansion nozzle or the entire cooling apparatus, the cooling-medium consumption is reduced and temperature fluctuations in the refrigeration or froster chamber are virtually avoided completely, assuring uniform product quality.

This object is accomplished with respect to the apparatus in that the expansion nozzle includes an integrated metering valve that has a discharge aperture, a valve seat on the intake side, and a valve needle that is adjustable relative to this valve seat and projects into the discharge aperture of the metering valve in the closed state, closing the metering valve in the discharge direction.

With respect to the method, the object is accomplished by the continuously-variable metering of the carbon-dioxide mass flow directly in the expansion nozzle.

With the expansion nozzle of the invention, it is possible to achieve a continuous supply of cooling medium with constant regulation, in accordance with the method of the invention, as opposed to intermittently supplying the carbon dioxide. This regulation is effected directly at the outlet of the CO$_2$ line. Thus, re-rinsing with CO$_2$ gas is no longer necessary. This not only reduces the cooling-medium consumption and increases the froster capacity, but simultaneously eliminates the gas line between the supply tank and the refrigeration or froster chamber from the design of the apparatus. With the constant cooling-medium metering, the temperature distribution is more precise, more uniform and constant over time in the refrigeration or froster chamber, and therefore in the refrigerated or frozen items. This contributes to increased product quality. The sprayed quantity can be completely arbitrarily constant or variable. The jet is advantageously steady, and not pulsating. No additional device is necessary for attaining the pressure in front of the expansion nozzle to prevent the pressure from falling below the triple point.

The dependent claims describe advantageous embodiments and modifications of the expansion nozzle and method of the invention.

The valve seat has a discharge funnel that narrows conically in the discharge direction, and an adjoining, short discharge channel. The metering valve preferably has a valve base with a valve chamber that is open to one side, and a cooling-medium connection aperture that leads to the valve chamber. The cooling-medium connection aperture preferably terminates into the valve chamber laterally and at an incline to the direction of the discharge aperture. The inclined position of the cooling-medium connection ensures that the liquid carbon dioxide is partially adapted to the flow direction in the valve base and the adjoining valve seat.

The valve needle is seated to be displaceable in the longitudinal direction of the needle relative to the open side of the valve chamber, and the tip of the needle projects out of the open side of the valve chamber, at least in the closed position of the valve needle. In the assembled state of the metering valve, the open side of the valve chamber is covered by a valve-seat plate that contains the valve seat, and is preferably detachably connected to the valve base with the use of a seal. This design permits a simple exchange of parts that are subject to wear, such as the valve needle and valve seat. For assembly, when the valve needle is in place, the valve-seat plate is simply pushed over the needle tip and is thereby automatically centered tightly against the needle. Care must be taken to ensure that the needle can move axially freely during assembly to prevent the needle from bending during mounting.

Opposite the valve seat, the valve needle is guided out of the valve base in a guide channel that extends outward from the valve chamber. The valve-needle head projecting out of the valve base is coupled to an actuating drive, for example a stepped motor. The actuating drive is used to move the valve needle axially. Because of the axial movement of the valve needle in the valve seat, the flow cross section can be varied very precisely. In this way, it is possible to regulate the cooling-medium mass flow. At the same time, the valve needle assumes the task of sealing the cooling-medium supply line in connection with the valve seat, in that the actuating drive presses the valve needle into the nozzle seat, creating an annular seal.

Without a further, downstream component, the valve generates a circular-ring-shaped cooling-medium jet comprising $CO_2$ gas and $CO_2$ snow. The shape of the jet changes with increasing distance from the metering valve. The free core of the circular jet disappears with increasing distance, so a circular jet forms from the circular ring. The flow cross section corresponds to the flow cross section of a conventional nozzle having a cylindrical flow cross section. In an arrangement of such expansion nozzles above a conveyor belt with a jet orientation of about 45° with respect to the vertical, elliptical spray surfaces are created for the refrigerated or frozen items on the conveyor belt. The time in which a certain refrigerated or frozen item is located on the conveyor belt in the cold spray jet is therefore dependent on the position on the conveyor belt, because the path that the refrigerated or frozen items must traverse through the jet also changes. If, for example, the refrigerated or frozen items are conveyed through the center of the elliptical spray jet, maximum cooling is effected, because the path through the spray jet is of maximum length. At the edge of the spray jet, in contrast, the refrigerated or frozen items are only cooled slightly, because the cooling phase does not last as long there due to the shorter path.

For this reason, it is particularly advantageous for a nozzle section whose cross section widens at the end side to adjoin the discharge channel as a jet shaper, in which the liquid carbon dioxide is expanded to form the jet. This is an inventive concept in and of itself.

On the side of the valve, the jet shaper preferably has a short, cylindrical channel that forms a nozzle throat, and an adjoining expansion region having a diverging flow cross section whose dimensions are selected corresponding to the desired jet shape. A rectangular flow cross section is particularly preferable here. This cross section is advantageously created by an expansion region, for example, that is embodied as a slot having two opposite, diverging sides and two opposite, parallel sides.

The diameter of the nozzle throat is selected as a function of the nominal width of the metering valve and the desired operating parameters in the refrigeration or froster chamber, and the length of the nozzle throat is selected as a function of the nominal width of the metering valve, the angle of the valve needle and the stroke of the actuating drive of the valve needle, such that the pressure of the carbon dioxide flowing through the nozzle throat does not drop below the triple-point pressure of the carbon dioxide within the nozzle throat. The nozzle throat of the jet shaper and the discharge channel of the valve seat preferably have the same diameter. In the assembled state of the expansion nozzle, the nozzle throat seamlessly adjoins the discharge channel. The total length of the nozzle throat and the discharge channel together should preferably be dimensioned according to the formula $$L = \frac{D/2}{\tan \alpha/2}.$$

Here D is the diameter of the nozzle throat and the discharge channel, respectively, and $\alpha$ is the angle of the needle tip. A deviation of approximately 10% in either direction from this value is acceptable, however. Only gaseous and liquid carbon dioxide flow through the nozzle throat, so the cooling medium can be further metered continuously without the occurrence of $CO_2$ snow clogs or deposits in the nozzle throat or discharge channel of the valve seat. The pressure first drops below the triple point inside the diverging expansion regions, and solid $CO_2$ snow particles form with a sudden increased formation of $CO_2$ gas.

As an alternative, it is also possible in principle to embody the nozzle throat and/or the discharge channel such that the total length can change as the position of the valve needle changes. In this instance, the length of the flow channel should decrease corresponding to the axial needle stroke when the valve needle is open.

Because the expansion region is designed to diverge, the $CO_2$ snow particles are directed away from the nozzle slot; thus, no or only secondary velocity components occur in the direction of the slot walls. This prevents clogging. With the widening of the jet, the velocity likewise increases in the axial direction, and transversely thereto. The $CO_2$ snow particles and the cold $CO_2$ gas therefore receive a stronger pulse, so the jet retains its direction and expansion after exiting the slot. The embodiment of the expansion region as a slot advantageously permits the formation of a flat jet having a rectangular spray cross section. In principle, the jet can be made wide enough that it extends over the entire width of the conveyor belt.

Hence, with the special arrangement of the metering valve and the adjoining jet shaper of the expansion nozzle according to the invention, in the expansion nozzle, the carbon-dioxide jet is first guided in annular fashion around the needle tip and into the discharge channel or nozzle throat, then guided together there and subsequently expanded purposefully, forming the carbon-dioxide snow. This prevents the pressure from falling below the triple point within the discharge channel or nozzle throat.

The metering valve and the jet shaper are advantageously flanged one behind the other as modular units of the expansion nozzle, with the connecting surfaces of the metering valve and the jet shaper preferably being nested and centered with a fit. It is therefore possible to selectively equip the metering valve with the corresponding, desired jet shaper, for example with the appropriate width.

The invention, of course, also encompasses a corresponding apparatus for cooling or shock-frosting refrigerated or frozen items, having at least one refrigeration or froster chamber, at least one supply line for liquid carbon dioxide that leads into the refrigeration or froster chamber, at least one expansion nozzle that is disposed at the end of the supply line in the chamber, and a metering valve that regulates the flow-through in the supply line, with the expansion nozzle containing the metering valve as an integrated component and being embodied according to the above-described invention.

An independent inventive concept within this apparatus is that a gas separator is interposed in the supply line for the liquid carbon dioxide; the separator separates the gas components in the liquid carbon dioxide. Due to the pressure drop and the heat flow into the pipeline, a formation of gas in the bubbling cooling medium removed from the tank is unavoidable without an external pressure increase or cooling of the pipeline. First, small gas bubbles form in the cooling medium, which grow very rapidly as they flow further through the pipe due to the considerably larger specific volume, and combine to form larger bubbles. Thus, entire regions of gas form from piston and plug bubbles; even lengthy segments of the pipe are partially filled with gas. The ratio of formed gas to the total mass flow is particularly high in thin cooling-medium supply lines. Because of the greatly-differing physical characteristics of gas and liquid, different flow ratios occur in the pipeline and the adjoining expansion nozzle. For example, the flow velocity and the associated volume flow in the gas flow-through (up to 220 m/sec) are significantly higher than in the liquid flow-through (roughly between 15 m/sec and 75 m/sec). The occurring fluctuations in velocity additionally cause an unsteady pressure loss in the cooling-medium supply line, which further intensifies the effect of large gas bubble formation. The pulsation-type expulsion of the cooling-medium jet from the expansion element also leads to an increased noise emission in comparison to the flow of single-phase cooling media. An increased noise level causes unpleasant stress for the operating personnel. Additionally, interferences and sources of danger cannot be perceived as readily. The danger associated with the increased flow velocity due to the bubbles is that sensitive, soft refrigerated or frozen items will be damaged. Lightweight refrigerated or frozen items can be spun by a powerful cooling-medium jet of the froster, and likewise be damaged or destroyed.

Through the separation of the gas phase from the liquid, a single-phase flow is achieved, which avoids the problems of inhomogeneous flows. The average flow velocity is reduced, so the pressure difference at the valve seat and in the nozzle throat is less than in an inhomogeneous flow. Thus, a higher absolute pressure is present at the end of the nozzle throat. For this reason, the pressure in the supply tank can be set lower than that of the liquid-gas mixture flow, that is, less than 18 bar, without the pressure being below the triple-point pressure in the nozzle throat. With the reduction in the tank pressure, the proportion of solid $CO_2$ snow that forms during the expansion increases again, which is in turn associated with a higher cooling capacity with the same quantity of cooling medium. The gaseous carbon dioxide that was separated in the gas separator can preferably be conducted into the refrigeration or froster chamber by way of a separate gas line for attaining the total cooling capacity of the supplied cooling medium. A further advantage of this gas separator is that the noise emissions are reduced.

The invention is described in detail below by way of embodiments, with reference to the attached drawings. Shown are in:

FIG. 3b a section through the jet shaper of FIG. 3a, transversely to the longitudinal direction of the slot along arrows IIIb—IIIb, FIG. 3c a section through a jet shaper according to FIG. 3a, in the longitudinal direction of the slot along arrows IIIc—IIIc, FIG. 4 a schematic representation of the gas separator of the invention, FIG. 5 a schematic plan view of a conveyor belt on which refrigerated or frozen items are disposed, in the refrigeration or froster chamber, and the jet geometry of the carbon-dioxide jet sprayed onto the conveyor belt.

Figure 1:
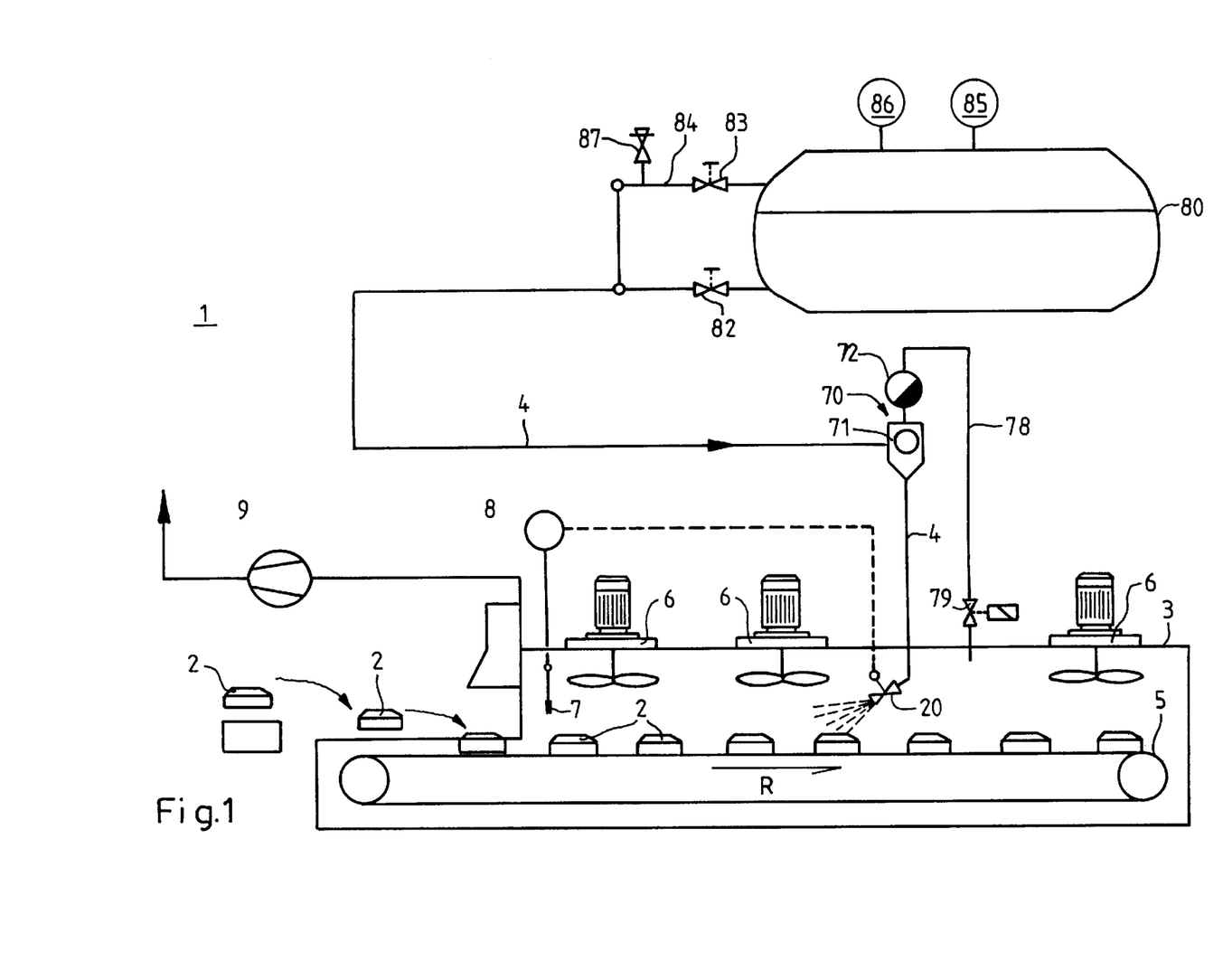
FIG. 1 a schematic representation of the apparatus of the invention.

FIG. 1 shows an apparatus (1) for shock-frosting refrigerated or frozen items (2), having a refrigeration or froster chamber (3), a supply line (4) for liquid carbon dioxide ($CO_2$), which leads into the refrigeration or froster chamber (3), and an expansion nozzle (20), which is disposed at the end of the supply line in the refrigeration or froster chamber (3), and in which the liquid carbon dioxide is expanded. The resulting jet of gaseous $CO_2$ and $CO_2$ snow is sprayed onto a conveyor belt (5) located in the refrigeration or froster chamber (3), on which the refrigerated or frozen items (2) are conveyed away under the expansion nozzle (20).

The liquid $CO_2$ is first held in a storage tank (80). Here it is in equilibrium with the $CO_2$ gas phase above the liquid in the tank (80). A controlled cooling aggregate (85), which preferably maintains the pressure in the tank (80) in a range of about 18 bar, is disposed at the tank (80). A temperature of about −23° C. is present. Further disposed at the tank (80) is a weighing device (85), which can be used to check the tank's contents, so that the cooling medium can be allocated timely when needed. The tank (80) itself is thermally insulated against penetrating heat, and therefore cold losses, by an approximately 160–200 mm thick insulating layer of PU foam.

An insulated pipeline (4) for the liquid $CO_2$ leads from the tank (80) to the expansion nozzle (20) in the refrigeration or froster chamber (3). A blocking element (82) is disposed in the liquid pipeline (4), directly behind the tank (80). A blocking element (83) and an overpressure valve (87) are likewise disposed directly behind the tank (80) in the gas line (84). Before the apparatus is started up, when the blocking element (82) in the is closed, the liquid pipeline (4) is pre-stressed with gaseous $CO_2$ by the opening of the blocking element (83) in the gas line (84), that is, the carbon-dioxide supply line (4) is brought under the same pressure as the tank (80). Subsequently, the stop valve (83) in the gas line (84) must be re-closed, and the liquid stop valve (82) can be opened. Without this pre-stressing with $CO_2$ gas, such a severe pressure drop would occur upon the opening of the liquid stop valve (82) that the pressure would still be below the triple-point pressure of the $CO_2$ of 5.18 bar within the supply line (4), and $CO_2$ snow would form in the line (4) and clog the pipeline (4).

A gas separator (70) is interposed in the cooling-medium supply line (4), in front of the refrigeration or froster chamber (3). The gas components contained in the liquid carbon dioxide are separated in the separator.

Figure 4:
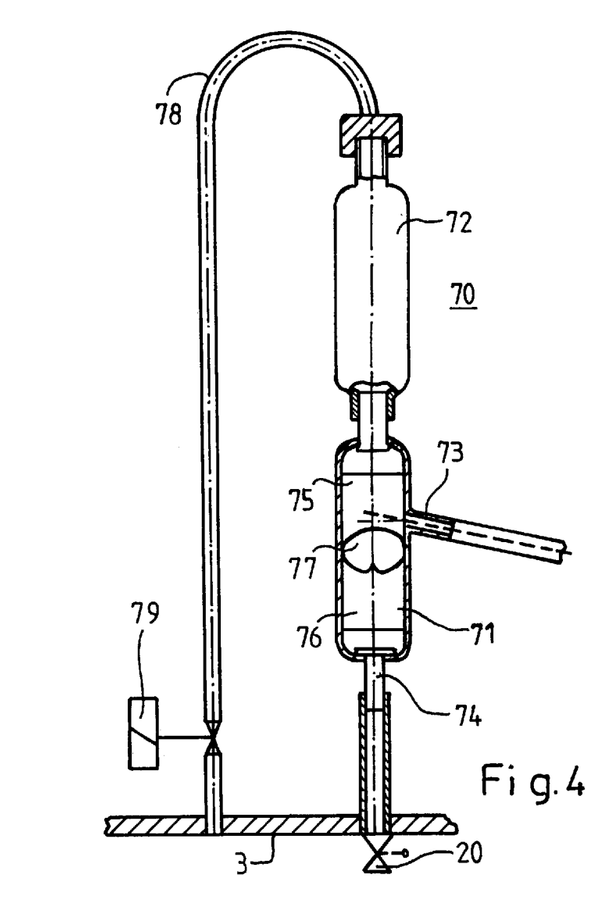

The gas separator (70) comprises a cylindrical pre-separation chamber (71) having intake connections (73) for the two-phase carbon dioxide, the connections being disposed laterally in the upper region, and a discharge nozzle (74) for the degassed liquid carbon dioxide in the lower region. The intake connection (73) is disposed at an acute angle to the pre-separation chamber (71), preferably less than 10°, and diagonally upward and tangentially to the longitudinal axis of the pre-separation chamber (FIG. 4). A circulation flow is effected by the influx of the $CO_2$ tangentially and from below. The occurring centrifugal forces cause the liquid to contact the walls of the pre-separation chamber (71), and gas to collect in the center, from where it is conducted away by a control head (72) disposed above the pre-separation chamber (71) and having a regulated discharge valve. The pre-separation chamber (71) is partitioned into two partial chambers (75, 76) by a horizontal partition wall (77), which is disposed below the intake connection (73) and provided with apertures. The partition wall is a perforated or slotted sheet. It is also possible to use a plurality of partition walls to divide the chamber further into a plurality of superposed chambers. This partitioning causes the gas to collect in the upper part of the pre-separation chamber (71).

The control head (72) comprises a float chamber having a discharge valve at the top, whose closing element is coupled to a float located in the float chamber. If gas collects in the control head (72), the float sinks and opens the valve, so the gas can be released through the control head (72). The separated gas is supplied to the refrigeration or froster chamber (3) through a separate supply line (78) that has a magnet valve (79) at one end. This line (78) is preferably also insulated against heat penetration. In a particularly preferred embodiment, the liquid and gaseous carbon dioxide exiting the gas separator (70) are conducted to the refrigeration or froster chamber (3) in a double pipeline formed by two coaxially-nested pipes, with the gaseous carbon dioxide being conducted through the outside, annular pipe. This minimizes cold losses.

A magnet valve (not shown) can likewise be disposed in the cooling-medium supply line (4), in front of the refrigeration or froster chamber (3), for additionally closing the supply line (4) during a lengthy pause in operation.

Figure 2:
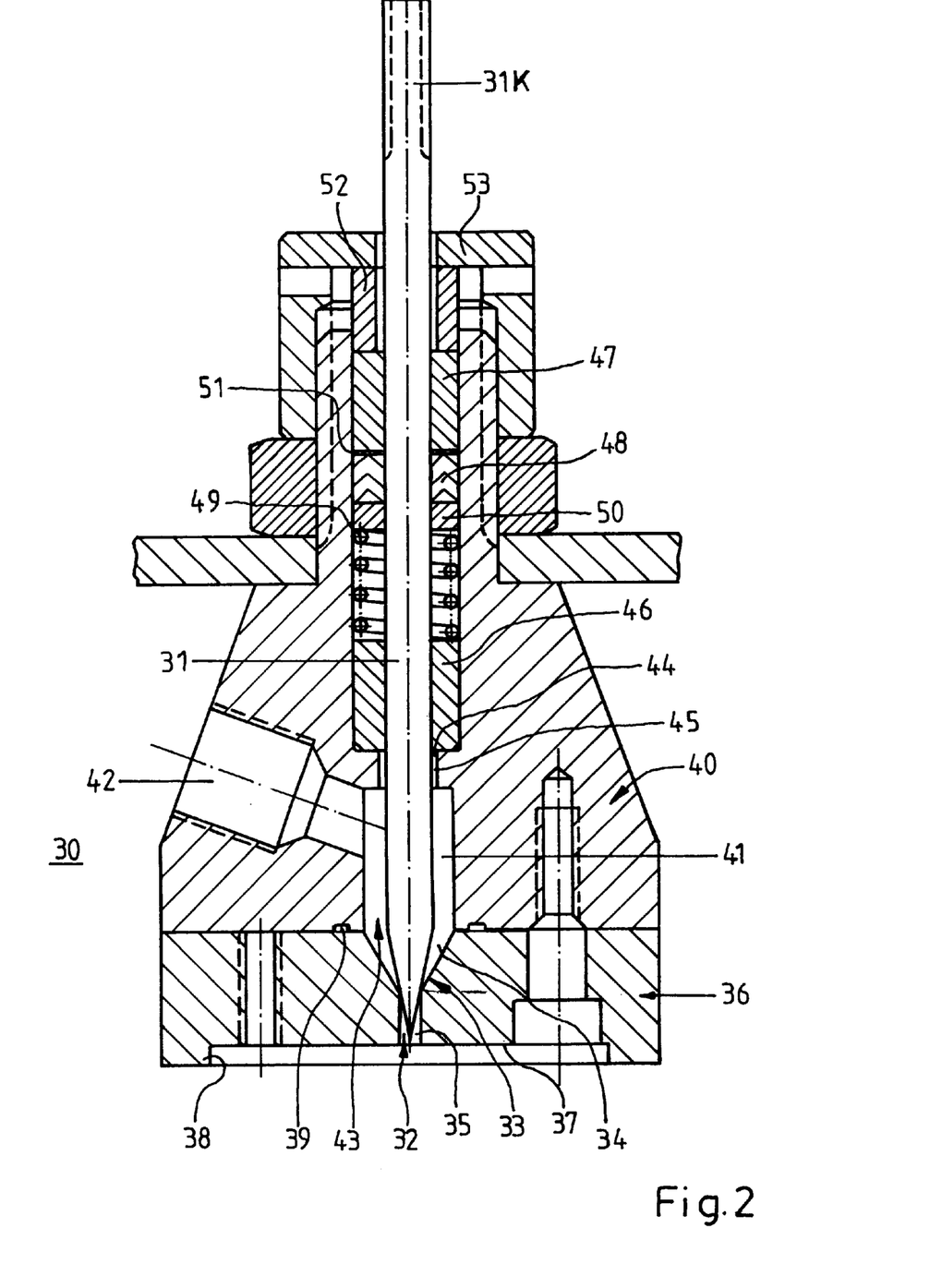
FIG. 2 a section through a metering valve of the invention.

The expansion nozzle (20) of the invention comprises a metering valve (30) that is disposed at the end side at the supply line (4), and a downstream jet shaper (60), which are flanged one behind the other as modular units (30, 60).

The metering valve (30) comprises a valve base (40) having an essentially cylindrical valve chamber (41) that is open to one side, and a cooling-medium connection aperture (42) that leads to the valve chamber (41). The open side of the valve chamber (41) of the metering valve (30) is covered by a valve-seat plate (36), which is detachably connected to the valve base (40) with the use of a seal (39). The valve seat (33), which has a discharge funnel (34) that narrows conically in the discharge direction, and an adjoining, short discharge channel (35), is disposed in the valve-seat plate (36). The discharge channel (35) is coaxial to the longitudinal axis of the valve chamber (41). The cross section of the discharge funnel (34) on the side of the valve chamber corresponds to the cross section of the valve chamber (41) in the valve base (40). A valve needle (31) that is seated to be displaceable in the longitudinal direction of the needle extends coaxially through the valve chamber (41) in the valve base. In the closed position, the tip of the needle projects out of the open side of the valve chamber (41) and into the discharge aperture (32) of the metering valve (30). Opposite the valve seat (33), the valve needle (31) is guided out of the valve base (40) in a guide conduit (44) extending from the valve chamber (41). The valve-needle head (31K) projecting out of the valve base (40) is coupled to an actuating drive used to move the valve needle (31) axially in the metering valve (30) for regulating the flow of cooling-medium mass, and to press the needle into the valve seat (33) for closing the cooling-medium line (4).

The guide channel (44) is separated from the valve chamber (41) by a constriction formed by an annular, radially inward-extending web (45). A first guide bushing (46), a spring element (49), a counter-ring (50), a plurality of annular seals (roof collars) (48) having a roof-shaped cross section, and a second guide bushing (47) with a bracket ring (51) that rests against the upper roof collar (48) are inserted in this sequence into the guide channel (44) over the valve needle (31) from the valve-needle head (31K). The valve needle (31) is held axially movably and with virtually no radial play in the guide bushings (46, 47), which are preferably produced from PTFE. A pressure bushing (52) is pushed over the valve needle (31) above the second guide bushing (47). A union nut (53), which is screwed on above the valve base (40) from above, presses the pressure bushing (52), the second guide bushing (47) with the bracket ring (51), the roof collars (48) and the counter-ring (50), counter to the spring force, against the first guide bushing (46) seated on the annular web (45). The compression of the roof collars (48) causes the inside edge of the roof collars (48) to be pressed tightly against the valve needle (31) and the outer edge of the roof collars (48) to be pressed tightly against the inside wall of the guide channel (44). In this way, the valve chamber (41) is sealed toward the outside against a nominal pressure of up to 20 bar. At the same time, the valve needle (31) is additionally guided by the roof collars (48). of course, commercially-available glands, for example, can also be used for sealing instead of the roof collars (48).

The valve-seat plate (36) is screwed directly under the valve base (40) by three screws. The system is designed such that a radial play of the valve-seat plate (36) exists when the fastening screws loosen slightly. This allows the valve-seat plate (36) to be centered with respect to the valve needle (31). In the assembly of the valve (30), first the valve needle (31) is inserted into the valve base (40) and moved outward in the axial direction, to the position it assumes later, when the valve (30) is closed. The valve-seat plate (36) can then be pressed against the valve needle (31), under the valve base (40), and is automatically centered. When the fastening screws of the valve-seat plate (36) are tightened, the valve needle (31) should be axially movable to prevent the valve needle (31) from bending. A seal (39) is disposed between the valve-seat plate (36) and the valve base (40).

The embodiment of the valve seat (33) as a discharge funnel (34) that narrows in the discharge direction and has an adjoining, short discharge channel (35) ensures that a uniformly-accelerated flow is achieved in the valve. An opening angle of the discharge funnel (34) between about 56° and about 76°, preferably 66°, has proven particularly advantageous. The valve needle (31) should preferably converge to a point at an angle between about 16° and about 30°. The valve seat (33) is advantageously manufactured from a material whose elastic properties permit a tight closure of the valve needle (31) and, despite its soft nature, exhibits no increased wear due to abrasive solid particles. As in the selection of the other materials, considerations include the durability of the food items and resistance to corrosion. Polycarbonate has proven particularly well-suited for use as a valve-seat material.

The cooling-medium connection aperture (42) is guided, at an incline, laterally into the valve chamber (41) in the direction of the discharge aperture (32). Thus, the cooling medium flowing in is partially adapted to the flow direction in the valve base (40).

When the expansion nozzle (20) is assembled, the discharge channel (35) of the valve seat (33) makes a seamless transition into a short, cylindrical nozzle throat (61) of the jet shaper (60) disposed behind it. Adjoining the nozzle throat (61) is an expansion region (62), which has a diverging flow cross section, and in which the liquid carbon dioxide is expanded to form the jet; the dimensions of the expansion region are selected corresponding to the desired jet shape. Care must be taken to ensure that the tip of the valve needle (31) does not project into the expansion region (62), if possible, during assembly.

Figure 3A:
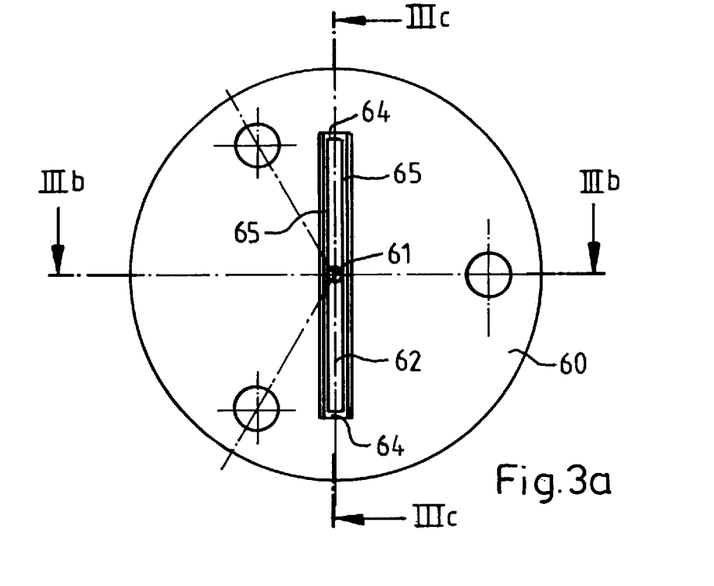
FIG. 3a a view from below of a rectangular, slot-like jet shaper.
Figures 3B, 3C:
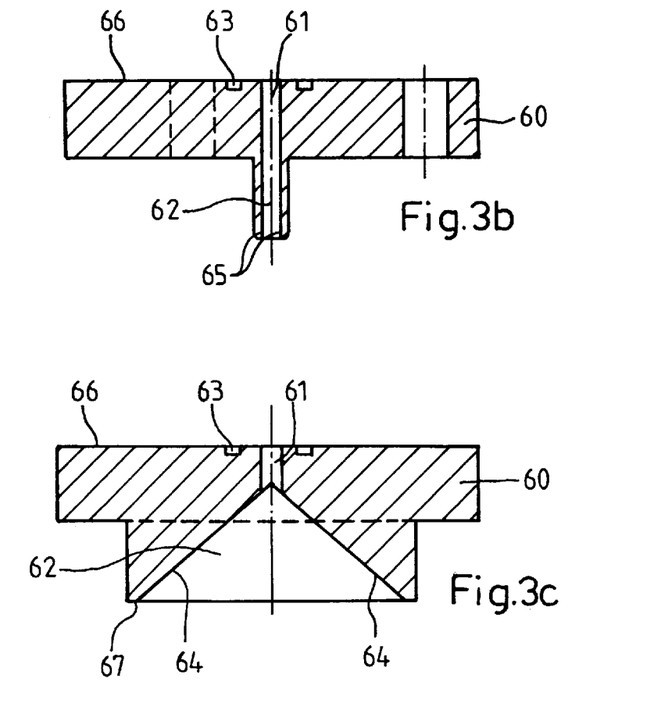

According to FIGS. 3a through 3c, the expansion region (62) has a rectangular flow cross section, and is embodied as a slot (62) having two opposite, diverging sides (64) and two opposite, parallel sides (65).

The length and diameter of the nozzle throat (61) and the discharge channel (35) of the valve seat (33), respectively, are selected such that the pressure of the carbon dioxide flowing through the nozzle throat (61) does not drop below the triple-point pressure of the $CO_2$ within the nozzle throat (61), so no $CO_2$ snow is formed here. The total length L of the nozzle throat (61) and the discharge channel (35), respectively, is to be selected according to the formula $$L = \frac{D/2}{\tan\alpha/2}$$

with a deviation of ±10%, where D is the diameter of the nozzle throat (61) and the discharge channel (35), respectively, and α is the angle of the valve-needle tip.

The $CO_2$ flows from the nozzle throat (61) into the slot (62), where it fills the entire cross section of the slot. Inside the nozzle slot, the pressure then drops below the triple point, causing a phase conversion of liquid $CO_2$ into solid $CO_2$ snow particles with a sudden increased formation of $CO_2$ gas. Because the nozzle slot (62) diverges, no clogs form inside the nozzle slot (62). Moreover, with the widening of the jet, the velocity increases in the axial direction and transversely thereto, so the $CO_2$ snow particles and the cold $CO_2$ gas receive a larger pulse. This causes the jet to retain its direction and expansion after exiting the slot (62). It is therefore possible to produce a flat jet having a rectangular spray cross section that extends over the entire width of the conveyor belt (5) in the refrigeration or froster chamber (3).

The cooling capacity of a cooling-medium jet depends on the quantity of sprayed $CO_2$ gas and the loading with $CO_2$ snow particles. This applies for both the entire jet and each individual angle of the jet. If the distribution of gas and snow is not uniform over the width of the jet, regions of varying cooling intensity form on the conveyor belt (5), and thus also in the refrigerated or frozen items (2). For this reason, the side walls (64, 65) of the jet shaper (60) are preferably straight. It is, however, also possible in principle to embody the diverging side walls (64) to be concave, or provide them with a plurality of adjacent, concave niches (not shown). The transition from the nozzle throat (61) into the slot (62) is sharp-edged for avoiding an increased snow concentration at certain jet angles. The outlet of the jet shaper (60) is likewise sharp-edged. This causes the exiting $CO_2$ jet to break away at the edge (67). The jet retains its direction and shape because of the received pulse. The edges of the jet can therefore be set very precisely. To prevent the jet shaper (60) from clogging due to the friction of the liquid and the $CO_2$ particles at the wall of the slot (62), the slot width should advantageously be larger than the diameter of the valve seat (33).

The total length of the slot (62) in the jet direction should be selected as a function of the pressure in front of the nozzle (20) and the total mass flow.

The inside surface of the slot (62) is advantageously produced with the least possible surface roughness to impede sticking of $CO_2$ snow particles to the surface.

With the jet shaper (60), it is possible to give the three-phase cooling-medium jet a desired shape. This is not attained through the diversion of a predetermined jet, but through the self-shaping of the cooling-medium jet as a consequence of the purposeful re-expansion.

To create a uniform jet, counter to the actual goal, the jet is first guided together as an annular jet emerging from the metering valve (30) so that it can be distributed uniformly from the flow core.

The connection surface (37) of the metering valve (30) is provided with a fit or annulus or rim (38), so the jet shaper (60) can likewise be connected, centered, to the metering valve (30) by three screws. These three screws for connecting the metering valve to the jet shaper (60) are correspondingly offset from the three screws used to secure the valve-seat plate (36) to the valve base (40). A seal (63) can also be disposed between the jet shaper (60) and the metering valve (30).

Figure 5:
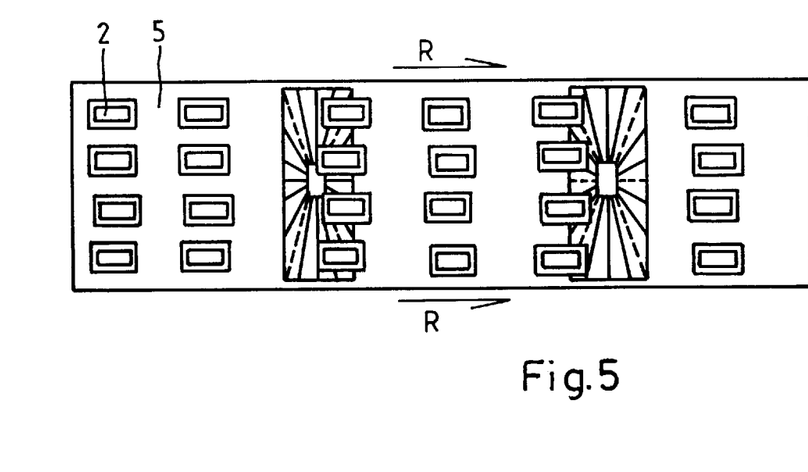

In a preferred embodiment according to FIG. 5, two expansion nozzles (20) are disposed one behind the other in the transport direction (R) in the refrigeration or froster chamber (3), above the conveyor belt (5). One of the expansion nozzles (20) is directed at the conveyor belt (5) diagonally, at a downward 45° angle in the transport direction (R), and the other expansion nozzle (20) is directed diagonally downward at the conveyor belt (5), counter to the transport direction (R). Thus, the front and rear sides of the refrigerated or frozen items (2) are acted upon by the spray jet. The two expansion nozzles (20) produce a rectangular cross section that extends over nearly the entire width of the conveyor belt (5). The refrigerated or frozen items (2) located next to one another on the conveyor belt (5) must then always traverse the same path through the spray jet, regardless of their position on the conveyor belt (5), effecting uniform cooling of the items (2). Of course, it is also possible to combine a plurality of adjacent expansion nozzles (20) disposed transversely to the transport direction (R) to form spraying blocks for spraying wider conveyor belts.

Likewise, it is possible, of course, to embody a refrigeration or froster chamber (3) to have only one expansion nozzle.

Ventilating fans (6) for ensuring strong swirling and thus good mixing of the froster-chamber atmosphere are disposed in the refrigeration or froster chamber (3). This arrangement effects a uniform background temperature. Also disposed in the refrigeration or froster chamber (3) is a temperature sensor (7), which is connected to a control device (8) that regulates the actuation drive of the expansion nozzles (20). To carry off the incoming $CO_2$ again after the refrigeration or froster chamber (3) has been heated, the refrigeration or froster chamber (3) has an outlet with a ventilating fan (9).

What is claimed is:

1. An expansion nozzle (20) for making carbon-dioxide snow from liquid carbon dioxide for spraying refrigerated or frozen items (2), wherein the nozzle has a discharge direction and comprises:

an integrated metering valve (30) including a discharge aperture (32), an intake-side valve seat (33) and a valve needle (31) adjustable relative to the valve seat (33), the needle being adapted to close the metering valve (30)

in the discharge direction; the needle projecting into the discharge aperture (32) of the metering valve (30) in a closed state of the metering valve;

the valve seat (33) including a short discharge channel (35);

a jet shaper (60) adjoining the discharge channel (35), in which the liquid carbon dioxide expands in a jet shape, the jet shaper including a nozzle segment having a cross section widened at an end thereof;

the jet shaper (60) including on a valve side thereof a short, cylindrical channel (61) acting as a nozzle throat (61), and adjoining thereto an expansion region (62) including a diverging cross section having dimensions being a function of the desired jet shape; and wherein the expansion region (62) comprises a rectangular flow cross section.

2. The expansion nozzle according to claim 1, characterized in that the valve seat (33) has a discharge funnel (34) that narrows conically in the discharge direction, and the discharge channel (35) adjoins the funnel.

3. The expansion nozzle according to claim 2, characterized in that the cross section of the valve chamber (41) is perpendicular to the longitudinal direction of the needle, the cross section corresponding to the cross section of the discharge funnel (34) of the valve seat (33) on the side of the valve chamber.

4. The expansion nozzle according to claim 2, characterized in that the discharge funnel (34) of the valve seat (33) has an opening angle between about 56° and about 76°, preferably 66°.

5. The expansion nozzle according to claim 1, characterized in that the metering valve (30) includes a valve base (40) with a valve chamber (41) that is open to one side, and a cooling-medium connection aperture (42) that leads to the valve chamber (41), and the valve needle (31) is seated to be displaceable in the longitudinal direction of the needle relative to the open side of the valve chamber (41) in the valve base (40), and the tip of the needle projects out of the open side (43) of the valve chamber (41), at least when the valve needle (31) is in the closed position, and, in the assembled state of the metering valve (30), the open side (43) of the valve chamber (41) is covered by a valve-seat plate (36) that contains the valve seat (33) and is detachably connected to the valve base (40).

6. The expansion nozzle according to claim 5, characterized in that the valve needle (31) is guided out of the valve base (40) in a guide channel (44) that extends from the valve chamber (41) opposite the valve seat (33).

7. The expansion nozzle according to claim 6, characterized in that the valve needle (31) is seated to be axially movable by way of at least two guide bushings (46, 47) disposed in the guide channel (44), and at least one annular seal (roof collar) (48) that has a roof-shaped cross section is preferably disposed between the guide bushings (46, 47), and is compressed axially for sealing purposes, with the inside edge of the roof collar (48) being pressed tightly against the valve needle (31) and the outside edge of the roof collar (48) being pressed tightly against the inside wall of the guide channel (44).

8. The expansion nozzle according to claim 7, characterized in that the guide channel (44) is separated from the valve chamber (41) by a constriction formed by an annular, radially inward-extending web (45), and a first guide bushing (46), a spring element (49), a counter-ring (50) that forms a base for the roof collar (48), at least one roof collar (48) and a second guide bushing (47) with a bracket ring (51) that rests against the roof collar (48) are inserted in this sequence into the guide channel (44) over the valve needle (31) from the valve-needle head (31K), and the second guide bushing (47), the bracket ring (51), the roof collar (48) and the counter-ring (50) are pressed, counter to the spring force, against the first guide bushing (46) seated on the annular web (45) by means of at least one screw element and/or a clamping element (52, 53).

9. The expansion nozzle according to claim 6, characterized in that the valve-needle head (31K) projecting out of the valve base (40) is coupled to an actuating drive.

10. The expansion nozzle according to claim 5, characterized in that the cooling-medium connection aperture (42) terminates into the valve chamber (41) laterally and at an incline to the direction of the discharge aperture (32).

11. The expansion nozzle according to claim 1, characterized in that the valve needle (31) converges to a point at an angle between about 16° and about 30°.

12. The expansion nozzle according to claim 1, characterized in that the expansion region (62) is embodied as a slot (62) having two opposite, diverging sides (64) and two opposite, parallel sides (65).

13. The expansion nozzle according to claim 1, to 15, characterized in that the diameter of the nozzle throat (61) is selected as a function of the nominal width of the metering valve (30) and the desired operating parameters in the refrigeration or froster chamber (3), and the length of the nozzle throat (61) is selected as a function of the nominal width of the metering valve (30), the angle of the valve needle (31) and the stroke of the actuating drive of the valve needle (31) such that the pressure of the carbon dioxide flowing through the nozzle throat (61) does not drop below the triple-point pressure of the carbon dioxide inside the nozzle throat (61).

14. The expansion nozzle according to claim 1, characterized in that the nozzle throat (61) of the jet shaper (60) has the same diameter as the discharge channel (35) of the valve seat (33), and seamlessly adjoins the discharge channel in the assembled state, and the total length of the nozzle throat (61) and the discharge channel (35) approximately corresponds to half of the diameter divided by the tangent of half of the angle of the needle tip.

15. The expansion nozzle according to claim 1, characterized in that the length of the nozzle throat (61) and/or the discharge channel (35) can be changed in association with the position of the valve needle (31).

16. The expansion nozzle according to claim 1, characterized in that the metering valve (30) and the jet shaper (60) are flanged one behind the other as modular units (30, 60) of the expansion nozzle (20).

17. The expansion nozzle according to claim 16, characterized in that the connection surfaces (37, 66) of the metering valve (30) and the jet shaper (60) are nested, and centered, with a rim (38).

18. An expansion nozzle (20) for making carbon-dioxide snow from liquid carbon dioxide for spraying refrigerated or frozen items (2), wherein the nozzle has a discharge direction and comprises:

an integrated metering valve (30) including a discharge aperture (32), an intake-side valve seat (33) and a valve needle (31) adjustable relative to the valve seat (33), the needle being adapted to close the metering valve (30) in the discharge direction the needle projecting into the discharge aperture (32) of the metering valve (30) in a closed state of the metering valve;

including at least one refrigeration or froster chamber (3), at least one supply line (4) for liquid carbon dioxide ($CO_2$) that leads into the refrigeration or froster chamber (3), at least one of the expansion nozzle (20) adjoining the end of the supply line in the refrigeration or froster chamber (3), wherein the metering valve (30) regulates the flow-through in the supply line, wherein the expansion nozzle (20) includes the metering valve (30) as an integrated component;

wherein a gas separator (70), which separates the gas components contained in the liquid carbon dioxide, is interposed in the supply line (4) for the liquid carbon dioxide.

19. The apparatus according to claim 18, characterized in that the gas separator (70) comprises a pre-separation chamber (71) having an intake connection (73) for the two-phase carbon dioxide, the connection being disposed laterally in the upper or center region, and an outlet connection (74) for the degassed, liquid carbon dioxide, the connection being disposed in the lower region, with the gas and liquid phases being separated from one another in the separator and the separated, gaseous carbon dioxide collecting in the upper region (75) and being carried off by way of a control head (72) disposed on the top side and having a regulated outlet valve.

20. The apparatus according to claim 19, characterized in that the intake connection (73) for generating a circulation flow in the pre-separation chamber (71) is disposed at the cylindrical pre-separation chamber (71), diagonally upward and tangentially to the longitudinal axis of the chamber.

21. The apparatus according to claim 19, characterized in that the pre-separation chamber (71) is partitioned into at least two partial chambers (75, 76) by at least one partition wall (77) disposed below the intake connection (73) and provided with apertures, and extending transversely to the longitudinal direction of the pre-separation chamber.

22. The apparatus according to claim 19, characterized in that the control head (72) comprises a float chamber with an outlet valve that is open to the top, whose closing element is coupled to a float located in the float chamber, and in an upper position of the float in the float chamber, the outlet valve is closed, whereas it is open in a lower position of the float.

23. The apparatus according to claim 18, characterized in that gaseous carbon dioxide separated in the gas separator (70) is conducted into the refrigeration or froster chamber (3) by way of a separate gas line (78).

24. The apparatus according to claim 23, characterized in that a blocking element (79) is disposed in the gas line (78), in front of the refrigeration or froster chamber (3).

25. The apparatus according to claim 23, characterized in that the liquid and gaseous carbon dioxide exiting the gas separator (70) are conducted to the refrigeration or froster chamber (3) in a double pipeline formed from two coaxially-nested pipes, with the gaseous carbon dioxide being conducted through the outside, annular pipe.

26. The apparatus according to claim 18, characterized in that a blocking element is disposed in the supply line for the liquid carbon dioxide, behind the gas separator and in front of the refrigeration or froster chamber (3).

27. The apparatus according to claim 18, characterized in that a plurality of expansion nozzles (20) that are connected to the supply line (4) for the liquid carbon dioxide are disposed in the refrigeration or froster chamber (3), above a transport device (5), particularly a conveyor belt (5), for the refrigerated or frozen items (2).

28. The apparatus according to claim 27, characterized in that at least two expansion nozzles (20) are disposed one behind the other in the transport direction (R), above the transport device (5), and at least one of the expansion nozzles (20) is directed at the conveyor belt (5) diagonally, at a downward 45° angle in the transport direction (R), and the other expansion nozzle (20) is directed diagonally downward at the transport device (5), counter to the transport direction (R).

29. An expansion nozzle (20) for making carbon-dioxide snow from liquid carbon dioxide for spraying refrigerated or frozen items (2), wherein the nozzle has a discharge direction and comprises:

an integrated metering valve (30) including a discharge aperture (32), an intake-side valve seat (33) and a valve needle (31) adjustable relative to the valve seat (33), the needle being adapted to close the metering valve (30) in the discharge direction, the needle projecting into the discharge aperture (32) of the metering valve (30) in a closed state of the metering valve;

wherein the valve seat (33) includes a discharge funnel (34) that narrows conically in the discharge direction;

wherein the discharge funnel (34) of the valve seat (33) includes an opening angle between about 56° and about 76°, preferably 66°;

wherein the valve needle (31) converges to a point at an angle between about 16° and about 30°; and wherein the valve needle (31) is guidable out of the valve base (40) in a guide channel (44) that extends from the valve chamber (41) opposite the valve seat (33).

30. The expansion nozzle according to claim 29, wherein the opening angle is 66°.

31. An expansion nozzle (20) for making carbon-dioxide snow from liquid carbon dioxide for spraying refrigerated or frozen items (2), wherein the nozzle has a discharge direction and comprises:

an integrated metering valve (30) including a discharge aperture (32), an intake-side valve seat (33) and a valve needle (31) adjustable relative to the valve seat (33), the needle being adapted to close the metering valve (30) in the discharge direction, the needle projecting into the discharge aperture (32) of the metering valve (30) in a closed state of the metering valve;

wherein the valve seat (33) includes a discharge channel (35) that narrows conically in the discharge direction;

a jet shaper (60) adjoining the discharge channel (35), in which the liquid carbon dioxide expands in a jet shape, the jet shaper including a nozzle segment having a cross section widened at an end thereof;

the jet shaper (60) including on a valve side thereof a short, cylindrical channel (61) acting as a nozzle throat (61), and adjoining thereto an expansion region (62) including a diverging cross section having dimensions being a function of the desired jet shape; and wherein the nozzle throat (61) of the jet shaper (60) has a same diameter as the discharge channel (35) of the valve seat (33), and seamlessly adjoins the discharge channel in an the assembled state of the nozzle, and wherein a total length of the nozzle throat (61) and the discharge channel (35) approximately corresponds to half of a tip diameter of the needle tip divided by the tangent of half of an angle of the needle tip.

32. An expansion nozzle (20) for making carbon-dioxide snow from liquid carbon dioxide for spraying refrigerated or frozen items (2), wherein the nozzle has a discharge direction and comprises:

an integrated metering valve (30) including a discharge aperture (32), an intake-side valve seat (33) and a valve needle (31) adjustable relative to the valve seat (33), the needle being adapted to close the metering valve (30) in the discharge direction, the needle projecting into the discharge aperture (32) of the metering valve (30) in a closed state of the metering valve;

wherein the valve seat (33) includes a discharge channel (35) that narrows conically in the discharge direction;

a jet shaper (60) adjoining the discharge channel (35), in which the liquid carbon dioxide expands in a jet shape, the jet shaper including a nozzle segment having a cross section widened at an end thereof;

the jet shaper (60) including on a valve side thereof a short, cylindrical channel (61) acting as a nozzle throat (61), and adjoining thereto an expansion region (62) including a diverging cross section having dimensions being a function of the desired jet shape; and wherein a nozzle throat/discharge channel length can be changed in association with a position of the valve needle (31).

33. An expansion nozzle (20) for making carbon-dioxide snow from liquid carbon dioxide for spraying refrigerated or frozen items (2), wherein the nozzle has a discharge direction and comprises:

an integrated metering valve (30) including a discharge aperture (32), an intake-side valve seat (33) and a valve needle (31) adjustable relative to the valve seat (33), the needle being adapted to close the metering valve (30) in the discharge direction, the needle projecting into the discharge aperture (32) of the metering valve (30) in a closed state of the metering valve;

wherein the valve seat (33) includes a discharge channel (35) that narrows conically in the discharge direction;

a jet shaper (60) adjoining the discharge channel (35), in which the liquid carbon dioxide expands in a jet shape, the jet shaper including a nozzle segment having a cross section widened at an end thereof;

the jet shaper (60) including on a valve side thereof a short, cylindrical channel (61) acting as a nozzle throat (61), and adjoining thereto an expansion region (62) including a diverging cross section having dimensions being a function of the desired jet shape; and wherein the diameter of the nozzle throat (61) is selected as a function of a nominal width of the metering valve (30) and desired operating parameters of a refrigeration or froster chamber (3), a length of the nozzle throat (61) is selected as a function of a nominal width of the metering valve (30), an angle of the valve needle (31) and the stroke of the actuating drive of the valve needle (31) such that the pressure of the carbon dioxide flowing through the nozzle throat (61) does not drop below the triple-point pressure of the carbon dioxide inside the nozzle throat (61).

* * * * *